June 18, 1940.
R. H. FLEET ET AL
2,204,546
DEVICE FOR HANDLING AIRCRAFT
Original Filed Oct. 14, 1936
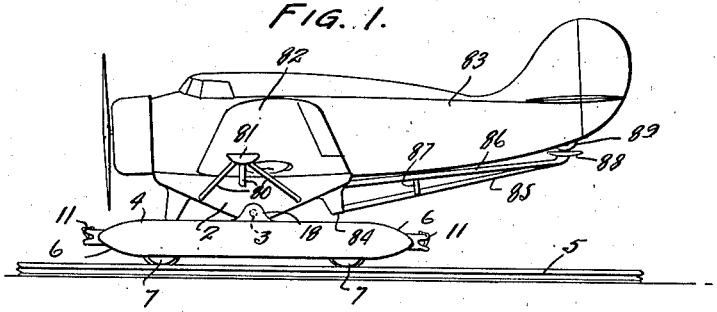
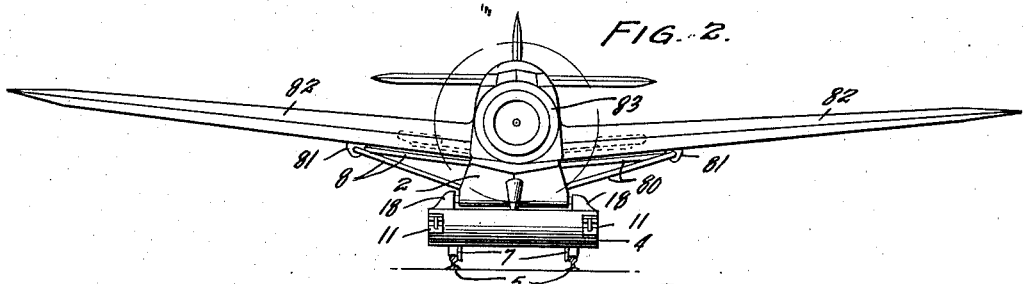
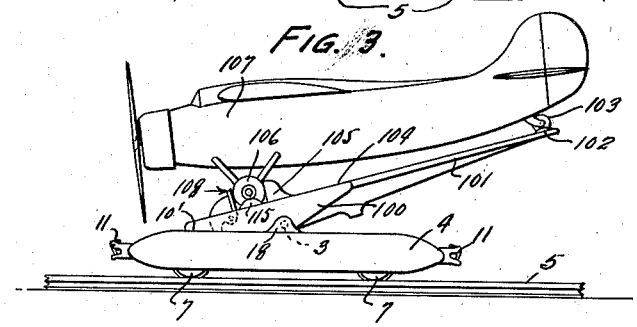
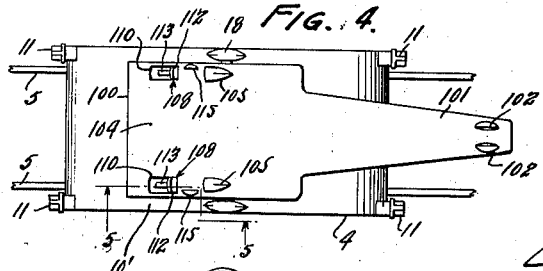
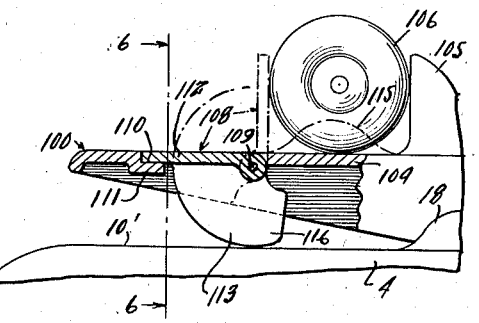
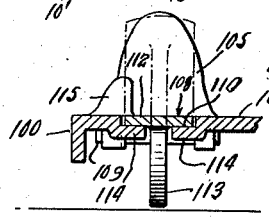
Inventors
REUBEN H. FLEET,
ISAAC M. LADDON AND
WILLIAM B. WHEATLEY
By Semmes & Semmes
Attorneys Patented June 18, 1940

2,204,546

UNITED STATES PATENT OFFICE 2,204,546

DEVICE FOR HANDLING AIRCRAFT

Reuben H. Fleet, William B. Wheatley, and Isaac M. Laddon, San Diego, Calif.

Original application October 14, 1936, Serial No. 105,611. Divided and this application June 22, 1937, Serial No. 149,781

7 Claims. (Cl. 244—63)

Our invention relates to airplanes, and more particularly to means for launching airplanes.

This application is a division of our joint application Serial No. 105,611, filed October 14, 1936.

In our application above referred to the advantages and necessities for a system permitting airplanes to be launched with larger loads than is at present possible were pointed out. This application being a division of that application, the lengthy discussion of the various factors considered in that application are not repeated herein.

An object of the invention is to provide proper bracing and support constructions in connection with the cradle for launching heavy landplanes with retractible chassis.

Another object of the invention is to provide a cradle for landplanes of the usual type in which the wheels are not retracted and in which the front wheel chock will be automatically taken out of the way just before the plane takes off from the cradle.

With these and other objects in view, which may be incident to our improvements, the invention consists in the parts and combinations to be hereinafter set forth and claimed, with the understanding that the several necessary elements comprising our invention may be varied in construction, proportions and arrangements, without departing from the spirit and scope of the appended claims.

In order to make our invention more clearly understood, we have shown in the accompanying drawing means for carrying the same into practical effect without limiting the improvements in their useful applications to the particular constructions which, for the purpose of explanation, have been made the subject of illustration.

In the drawing:

Fig. 1 is a view in side elevation of a landplane with retractible chassis mounted on a special type cradle;

Fig. 2 is a view in front elevation of the device shown in Figure 1;

Fig. 3 is a view in side elevation of another form of cradle construction for landplanes with non-retractible chassis;

Fig. 4 is a top plan view of the car and cradle shown in Figure 3;

Fig. 5 is a view taken along the line 5—5 of Figure 4, looking in the direction of the arrows;

Fig. 6 is a detail view taken along the line 6—6 of Figure 5, looking in the direction of the arrows.

Referring to the drawing, in Figures 1 and 2, we have shown a construction of cradle which is particularly adapted for use with landplanes having retractible chassis. In such type of construction the bottom of the landplane is in general rounded. In order to support the plane properly in the cradle, we have shown the cradle 2 provided with outrigger support arms 80 carried in supports 81. The outrigger arms 80 may be joined to the side of the cradle and in general we employ a construction embodying three arms 80, as indicated in Figure 1. The end supports 81 may fit under the wings 82 of a landplane 83. This construction provides lateral support to prevent rolling of the landplane 83 during its transport upon the cradle 4.

In order to support the airplane to give it longitudinal stability, we have shown the cradle 4 provided with a downward bracing member 84 to which is attached an arm 85. To the upper part of the cradle 4 is attached an arm 86. The arms 85 and 86 are joined by a strengthening connecting element 87. The end of the two arms 85 and 86 are joined together and support an end support 88 for the tail. This end support 88 in general will be positioned so as to support the tail skid wheel 89 which is shown in Figure 1 as partly retracted. Thus longitudinal stability of the plane 83 is achieved as well as the lateral stability.

In Figures 3 to 6 inclusive we have shown another type of construction for a landplane having a non-retractible chassis. Here the problem of preventing the rolling of the landplane off the cradle is important. We have shown pivoted at 3 on the supports 18 a cradle 100 which is provided with a tail 101 having side braces 102. The side braces 102 lie on either side of the tail skid wheel 103 and prevent its movement laterally. The cradle is provided on its main supporting surface 104 with rear chocks 105 which are adapted to lie in rear of the wheels 106 of a landplane 107. In front of the wheels 106 are movable chocks 108.

The movable chocks 108 are pivoted at 109 in the body 104 of the cradle 100. Apertures are provided at 110 in the main body 104 of the cradle 100, and supporting lips 111 at the front of the apertures 110 are adapted to support the upper surface 112 of each chock 108.

Each chock 108 is provided with a round cam-like element 113 which is joined to the upper surface 112. In addition to the supporting lip 111 at the front of the aperture 110 there are provided supporting lips 114 formed from the upper surface 10 of the car 4.

Side braces 115 are provided between the chocks 105 and the movable chocks 108 to prevent the wheels 106 from sliding laterally.

When the front chocks 108 are in their raised position, indicated in dotted lines in Figure 5 and in solid lines in Figure 3, the wheels 106 cannot roll forward. In such position the cam-like members 113 have flat surfaces 116 which rest on the upper surface 10' of the car 4.

When the landplane 107 has its control surfaces manipulated to change it from a no-lift attitude, such as is shown in Figure 3, the front chocks 108 fall by gravity into the position shown by solid lines in Figure 5 and permit the wheels 106 to roll off the car 4 and the airplane 107 to take to the air.

It is to be understood that in all of the types of cradles in the drawing the airplane is adapted to start off in a no-lift attitude and that it is changed from the no-lift attitude by manipulation of the control surfaces of the plane only when sufficient speed has been picked up to permit the airplane to fly off the cradles. All this is explained in our co-pending application previously referred to.

While we have shown and described the preferred embodiment of our invention, we wish it to be understood that we do not confine ourselves to the precise details of construction herein set forth by way of illustration, as it is apparent that many changes and variations may be made therein, by those skilled in the art, without departing from the spirit of the invention, or exceeding the scope of the appended claims.

We claim:

1. A support for launching an airplane comprising a movable member, a rapidly tiltable cradle on the movable member upon which the airplane is adapted to rest, a pivot for the cradle having its axis laterally disposed on the movable member, and rigid outrigger members adapted to be attached to the wings and extending to the side of the cradle and adapted to steady the airplane laterally by passing upward against the airplane wings.

2. A support for launching an airplane from rail tracks, comprising a vehicle, wheels for the vehicle adapted to run on the rails, a rapidly tiltable cradle on the vehicle upon which the airplane is adapted to rest, a pivot for the cradle having its axis laterally disposed on the vehicle, and rigid outrigger members adapted to be attached to the wings and extending to the side of the cradle and adapted to steady the airplane laterally by pushing upward against the airplane wings.

3. In a launching device for airplanes with wheels, a movable member, a cradle pivoted to said movable member, a front chock member for the wheels pivoted to the cradle, a rear chock member affixed to the cradle, a portion of said front chock member being adapted to contact the upper surface of the movable member when the plane and cradle are in a no-lift attitude and said chock member being adapted to fall by gravity upon movement of the plane and cradle into the lift attitude.

4. In a launching device for airplanes with wheels, a movable member, a cradle pivoted to said movable member, a front chock member for the wheels pivoted to the cradle, a rear chock member affixed to the cradle, a portion of said front chock member being adapted to contact the upper surface of the movable member when the plane and cradle are in a no-lift attitude, said chock member being adapted to fall by gravity upon movement of the plane and cradle into the lift attitude and a support attached to the lower portion of the cradle extending rearwardly from the cradle to support the rear of the fuselage of the airplane.

5. A support for launching an airplane comprising a movable member, a cradle upon the movable member upon which the airplane is adapted to rest, a pivot for the cradle having its axis laterally disposed upon the movable member, means for controlling longitudinal movement of the airplane relative to the movable member, wheel guides adapted to prevent lateral movement of the airplane wheels, a support attached to the lower rear portion of the cradle and extending rearwardly from the cradle and adapted to support the tail of the airplane, and tail piece guides carried by said support adapted to engage a tail supporting member solely so as to prevent lateral motion of the airplane tail.

6. A support for launching an airplane comprising a movable member, a cradle upon the movable member upon which the airplane is adapted to rest, a pivot for the cradle having its axis laterally disposed upon the movable member, movable chock means for engaging the forward portion of the airplane wheels to controllably resist relative forward movement of the airplane until rearward tilting of the cradle has occurred, fixed chock means for continuously engaging the rear portion of the airplane wheels, wheel guides adapted to prevent lateral movement of the airplane wheels, and a support attached to the lower rear portion of the cradle and extending rearwardly from the cradle and adapted to support the tail of the airplane, said rearward support having fixed chocks to prevent lateral movement of the tail relative to said support.

7. In a launching device for airplanes with wheels, a movable member, a cradle pivoted to said movable member, a front chock member for the wheels pivoted to the cradle, a rear chock member affixed to the cradle, a portion of said front chock member being adapted to contact the upper surface of the movable member so as to resist forward movement of the wheels when the airplane and cradle are in a no-lift attitude and said chock member being free from said contact with said upper surface upon movement of the airplane and cradle into the lift attitude, whereby the front chock member can pivot forward to a position presenting its resisting surface substantially flush with the top surface of the cradle, means carried by the cradle to prevent said forward pivoting beyond said flush position.

REUBEN H. FLEET.
WILLIAM B. WHEATLEY.
ISAAC M. LADDON.